United States Patent [19]

Thomaides et al.

[11] Patent Number: 4,948,398
[45] Date of Patent: Aug. 14, 1990

[54] MULTI-CANDLE FIBER MIST ELIMINATOR

[75] Inventors: Lazarus Thomaides, North Wales; Steven I. Taub, Narberth, both of Pa.

[73] Assignee: Ceco Filters, Inc., Conshohocken, Pa.

[21] Appl. No.: 345,158

[22] Filed: Apr. 28, 1989

[51] Int. Cl.$^5$ ............................................. B01D 46/00
[52] U.S. Cl. .......................................... 55/97; 55/320; 55/484; 55/498; 55/508; 55/518; 55/520; 55/527; 55/DIG. 25
[58] Field of Search .................. 55/187, 188, 320–324, 55/378, 379, 484, 498, 508, 511, 516, 518, 520, 527, 528, DIG. 25, 97

[56] References Cited

U.S. PATENT DOCUMENTS

| | | |
|---|---|---|
| 1,982,095 | 11/1934 | Hechenbleikner . |
| 2,116,085 | 5/1938 | Van Berkel . |
| 2,210,397 | 8/1940 | Dreiss . |
| 2,322,548 | 6/1943 | Sigmund . |
| 2,397,759 | 4/1946 | Sigmund . |
| 2,400,180 | 5/1946 | Venable . |
| 2,421,705 | 6/1947 | Kasten . |
| 3,330,101 | 7/1967 | Murphy . |
| 3,421,630 | 1/1969 | Acosta . |
| 3,471,022 | 10/1969 | Conrad . |
| 3,488,928 | 1/1970 | Tarala . |
| 3,540,190 | 11/1970 | Byink ........................... 55/484 X |
| 3,680,286 | 8/1972 | Nostrand et al. . |
| 3,954,449 | 5/1976 | Rudorler et al. ................ 55/484 X |
| 4,053,290 | 10/1977 | Chen et al. . |
| 4,086,070 | 4/1978 | Argo et al. . |
| 4,089,664 | 5/1978 | Noland ........................ 55/379 X |
| 4,203,739 | 5/1980 | Erdmannsdörfer . |
| 4,243,535 | 1/1981 | Behrends et al. . |
| 4,249,918 | 2/1981 | Argo et al. ............... 55/DIG. 25 X |
| 4,251,244 | 2/1981 | Evenstad ..................... 55/379 X |
| 4,324,572 | 4/1982 | Erdmannsdörfer et al. . |
| 4,576,799 | 3/1986 | Wörner et al. . |
| 4,655,805 | 4/1987 | Krantz . |
| 4,662,911 | 5/1987 | Hirayama et al. . |
| 4,818,257 | 4/1989 | Kennedy et al. ................ 55/498 X |

FOREIGN PATENT DOCUMENTS 1237198 6/1960 France .

OTHER PUBLICATIONS

*Perry's Chemical Engineers' Handbook* (6th Ed. 1984), pp. 18-83–18-84.
*Pollution Engineering Practice Handbook* (1975), pp. 177–178.
W. Strauss, *Industrial Gas Cleaning* (1966), pp. 280–281.

Primary Examiner—Charles Hart
Attorney, Agent, or Firm—Seidel, Gonda, Lavorgna & Monaco

[57] ABSTRACT

A fiber bed mist eliminator comprising at least two radially spaced and concentrically disposed fiber bed elements. The elements have an opened upper and lower end forming substantially vertical, independent channels through which gases can flow. The mist eliminator further comprises baffle means of imperious material, horizontally disposed at the upper and lower ends of the mist eliminator. The baffle means closes the bottom of one channel and the top of an adjacent channel, thus forcing a gas stream to pass through not more than one fiber bed element.

20 Claims, 6 Drawing Sheets

MULTI-CANDLE FIBER MIST ELIMINATOR

FIELD OF THE INVENTION

This invention relates to improved fiber bed separator assemblies and process for the separation of aerosols from gas streams. More particularly, it relates to a fiber bed mist eliminator wherein the fiber bed surface area is increased without increasing the circumferential dimensions of the mist eliminator.

BACKGROUND OF THE INVENTION

Fiber bed mist eliminators have found widespread use in applications wherein it is necessary to separate extremely fine aerosols of less than three microns in particle size from a gas or vapor stream. Fiber beds having fibers up to 20 microns in diameter have been found to remove aerosols with a particle size of less than 3 microns with high collection efficiency (e.g., as high as 98–99.9% efficiency).

In fiber bed separator assemblies containing fiber bed mist eliminators, it is desirable to decrease either the number or the circumferential dimension of the mist eliminators, or both, since doing so could decrease the overall size of the separator assembly and, thus, reduce capital costs. However, when attempted in the past, this resulted in more disadvantages than advantages since the pressure drop through the fiber bed walls of the mist eliminator is inversely proportional to the surface area of the fiber beds. In other words, as the surface area of the fiber beds decreases, the pressure drop through these fiber beds increases, and vice versa.

In view of the aforementioned inherent characteristics of fiber bed mist eliminators, if the reduction of the number and/or the circumferential dimension of fiber bed mist eliminators contained in a separator assembly decreases surface area, in order to maintain the output volume of gas the same as that prior to the reduction, it is necessary to increase the input velocity of the gas flowing into the separator assembly. This is undesirable since increasing the input velocity of the gas has a cost associated therewith. Moreover, it is also undesirable to increase the input velocity of the gas entering the separator assembly since doing so will inherently increase the velocity of the gas flowing through the fiber beds of the mist eliminators. This may result in re-entrainment of aerosols captured in these fiber beds.

If, on the other hand, input velocity of gas is maintained at the same level as that prior to the reduction, the output volume of gas from this vessel would decrease. This is also undesirable since it results in production losses which, again, has a cost associated therewith.

Notwithstanding the above, it is also desirable to increase either the number or the circumferential dimension, or both, of the fiber bed mist eliminators in a separator assembly, since doing so would increase the surface area of fiber beds. However, while it is true that increasing the surface area of the fiber beds decreases the pressure drop therethrough, in order to make such an increase, it would be necessary to enlarge the size of the mist eliminators, or the separator assembly, or both. In many instances this is not possible due to space limitations in the plant where the separator assembly is being utilized. However, even if there is adequate space for accommodating a larger separator assembly, it is generally not desirable to construct a larger vessel due to the capital cost associated therewith.

In view of the above, the industry would gratefully accept a fiber bed separator assembly containing mist eliminators which, while maintaining the same circumferential dimension, have a substantially increased fiber bed surface area. Accordingly, one object of the invention is to provide a means for increasing the fiber bed surface area of a mist eliminator without increasing the mist eliminator's circumferential dimension.

Another object of this invention is to reduce the number and/or size of mist eliminators required in a separator assembly without requiring an increase of input energy into the assembly or suffering a reduction of output volume therefrom.

Yet another object of this invention is to increase the output volume of gas without the re-entrainment of the collected liquid phase aerosols back into the output gas stream.

Other objects, aspects and concepts of this invention will become apparent to those skilled in the art upon reading the specification and appended claims which follow.

SUMMARY OF THE INVENTION

In one embodiment, the invention provides a fiber bed mist eliminator adapted for the removal of aerosols of less than three microns from a moving gas stream.

The fiber bed mist eliminator of the present invention comprises at least two radially spaced and concentrically disposed fiber bed elements. Each of these elements have an opened upper and lower end forming substantially vertical, independent, channels. The mist eliminator further comprises baffle means of impervious material, horizontally disposed at the upper and lower ends of the mist eliminator. The baffle means closes the bottom of one channel and the top of an adjacent channel, thus, forcing an aerosol-containing gas stream to pass through not more than one of the fiber bed element.

The present invention further provides a fiber bed separator assembly for the removal of aerosols of less than three microns from a moving gas stream. The separator assembly comprises a vessel having an inlet means for an aerosol-containing gas to enter and an outlet means for a substantially aerosol-free gas to exit. The separator assembly further comprises at least one fiber bed mist eliminator fixably secured in the vessel at a location between the vessel inlet means and the vessel outlet means and disposed in a substantially vertical position. This fiber bed mist eliminator comprises, as above, at least two radially spaced and concentrically disposed fiber bed elements, each having an opened upper and lower end forming substantially vertical, independent, channels. Also as above, the mist eliminator further comprises baffle means of impervious material horizontally disposed at the upper and lower ends of the mist eliminator, closing the bottom of one channel and the top of an adjacent channel, for forcing the aerosol-containing gas stream to pass through not more than one fiber bed element, prior to exiting through the vessel outlet means.

For the purpose of illustrating the invention, the drawings illustrate presently preferred embodiments. It is understood, however, that the present invention is not limited to the precise arrangements and instrumentalities shown therein. A brief description of the drawings is as follows.

DETAILED DESCRIPTION OF THE INVENTION

In industry, it is often desirable to employ fiber bed mist eliminators having reduced circumferential dimensions due to space constraints. However, it is equally desirable to reduce the pressure differential through the fiber bed without sacrificing the efficiency of the mist eliminator. If the input velocity of the gas remains constant, the pressure differential through the fiber beds can be decreased by increasing their surface area. As can be seen, however, a trade-off exists between space constraints and separation efficiency.

The present invention resolves the above dilemma by providing a mist eliminator which, while maintaining the same circumferential dimension, substantially increases the fiber bed surface area. The novel mist eliminator comprises at least two radially spaced and concentrically disposed fiber bed elements. Each of these elements have an opened upper and lower end forming substantially vertical, independent, channels. The novel mist eliminator further comprises baffle means of impervious material horizontally disposed at the upper and lower ends of the mist eliminator. The baffle means closes the bottom of one channel and the top of an adjacent channel, thus, forcing and aerosol-containing gas stream to pass through not more than one fiber bed element. If there are more than two concentrically disposed, radially spaced fiber bed elements, alternating flow passages are opened and closed at axially opposite ends.

Figure 1:
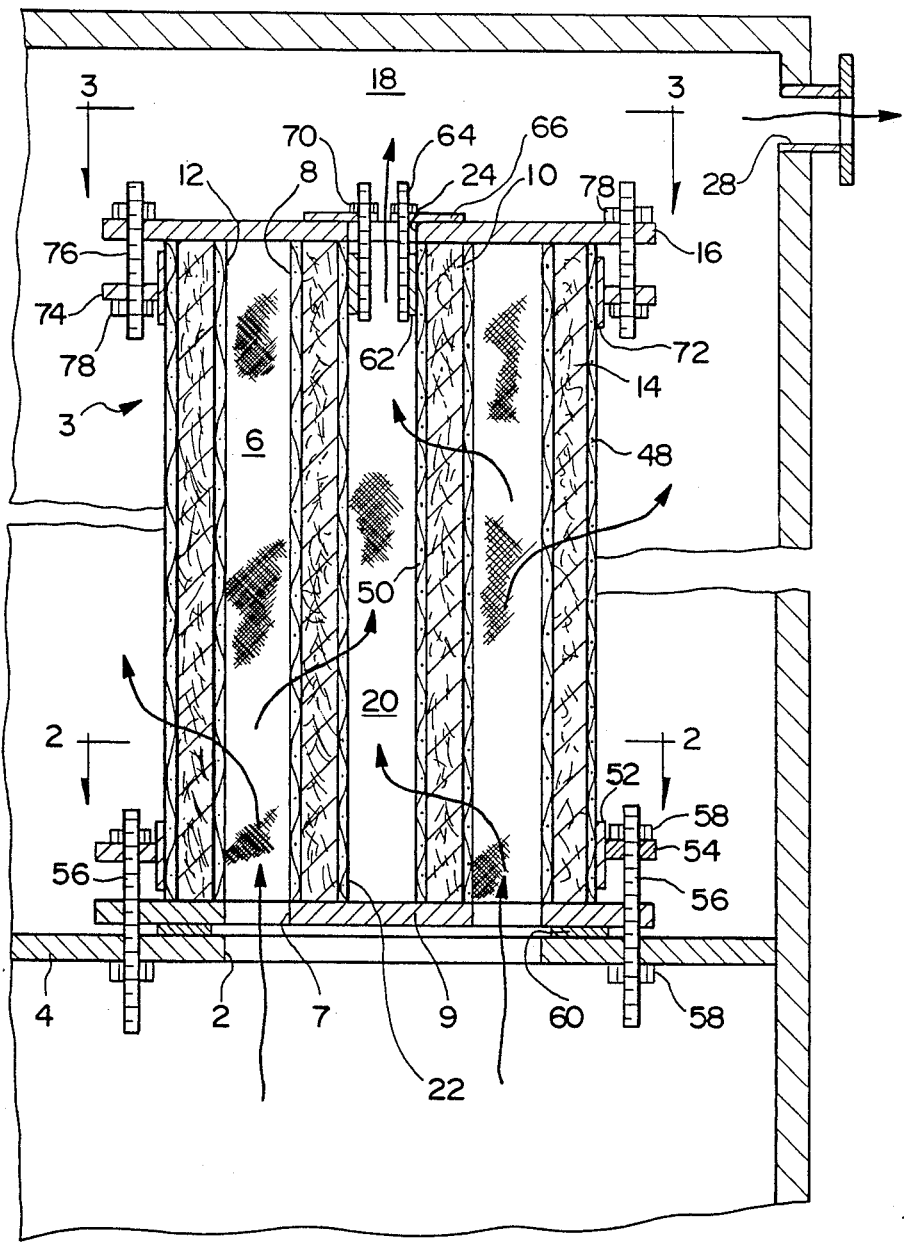
FIG. 1 is a cross-sectional view of an inside/out fiber bed mist eliminator constructed in accordance with the present invention.
Figure 4:
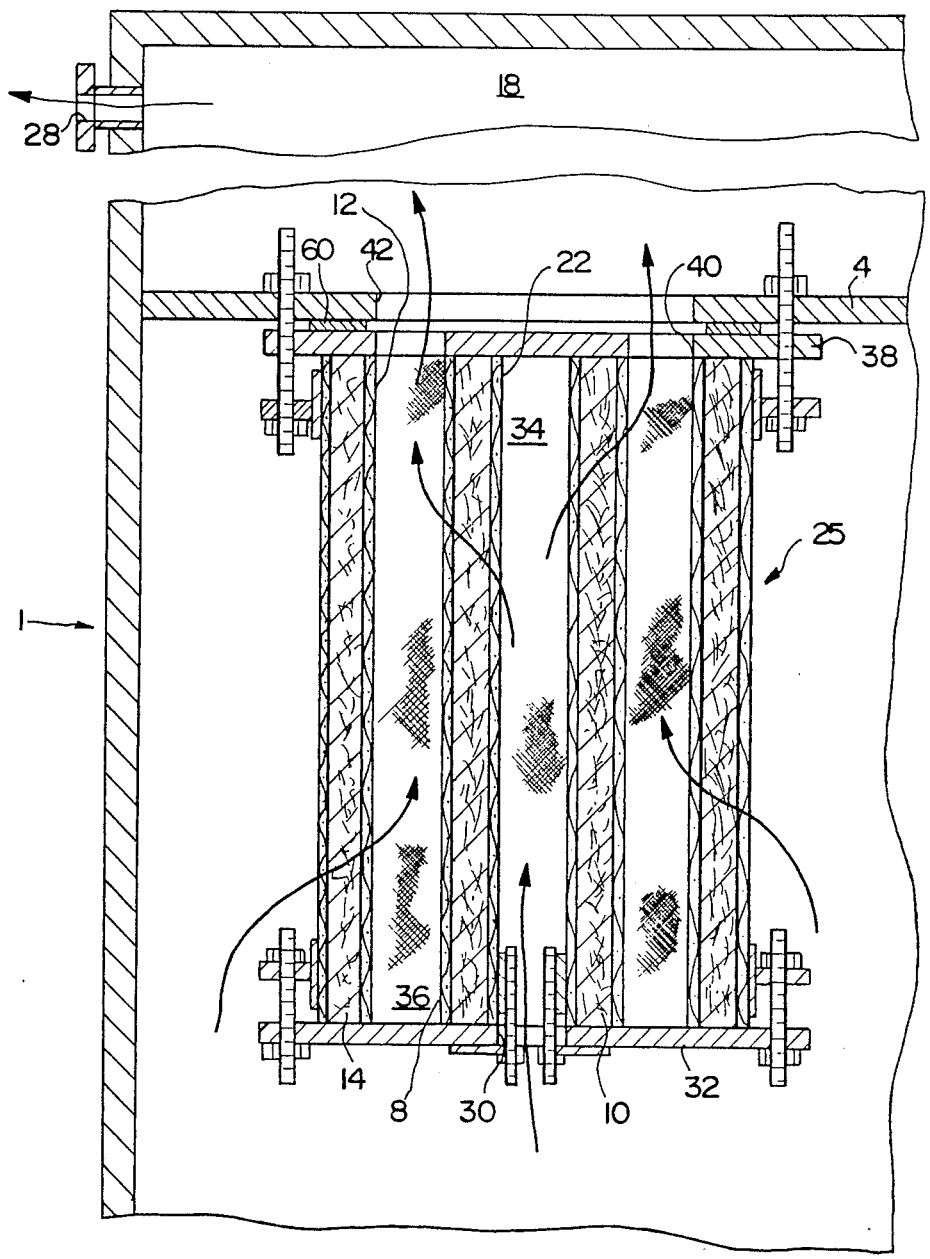
FIG. 4 is a cross-sectional view of an outside/in fiber bed mist eliminator constructed in accordance with the present invention.

Referring now to FIGS. 1 and 4, an "inside/out" and an "outside/in" fiber bed mist eliminator, respectively, is illustrated. In the assembly employing the inside/out fiber bed mist eliminator 3 (i.e., FIG. 1), processed gas enters vessel 1 from an inlet (not shown) in the bottom of the vessel and travels upwardly through opening 2 in the tube sheet 4 through opening 7 in first baffle means 9 and into the radially annular space 6. Annular space 6 is defined by the outside wall 8 of inner fiber bed 10 and the inside wall 12 of outer fiber bed 14.

A second baffle means 16 closes off the upper end of radially annular space 6. This forces gas entering into annular space 6 to pass either through outer fiber bed 14 into space 18 or through inner fiber bed 10 into annular space 20 defined by the inside wall 22 of fiber bed 10. Once entering annular space 20, the substantially aerosol-free gas stream flows through opening 24 in second baffle plate 16 and into space 18. The substantially aerosol-free gas stream entering into space 18 either after passing through outer fiber bed 14 or inner fiber bed 10, exits vessel 1 through outlet opening 28.

In FIG. 4 separator assembly employing outside/in fiber bed mist eliminator 25 is illustrated. In this assembly, processed gas enters vessel 1 from an inlet (not shown) in the bottom of the vessel. The aerosol-containing gas can travel either through opening 30 of third baffle plate 32 and into annular space 34 or through outer filter bed 14 and into radially annular space 36. Annular space 34 is defined by the inside wall 22 of inner fiber bed 10. Radially annular space 36 is defined by the outside wall 8 of inner fiber bed 10 and the inside wall 12 of outer fiber bed 14.

Fourth baffle plate 38 blocks off the upper end of annular space 34 while leaving the upper end of annular space 36 opened. Thus, the gas stream entering annular space 34 is forced to pass through inner fiber bed 10 and into radially annular space 36. Once the gas stream enters radially annular space 36, either from passing through outer fiber bed 14 or inner fiber bed 10, the substantially aerosol-free gas stream exits therefrom through opening 40 in fourth baffle plate 38 and opening 42 in tube sheet 4.

Figure 2:
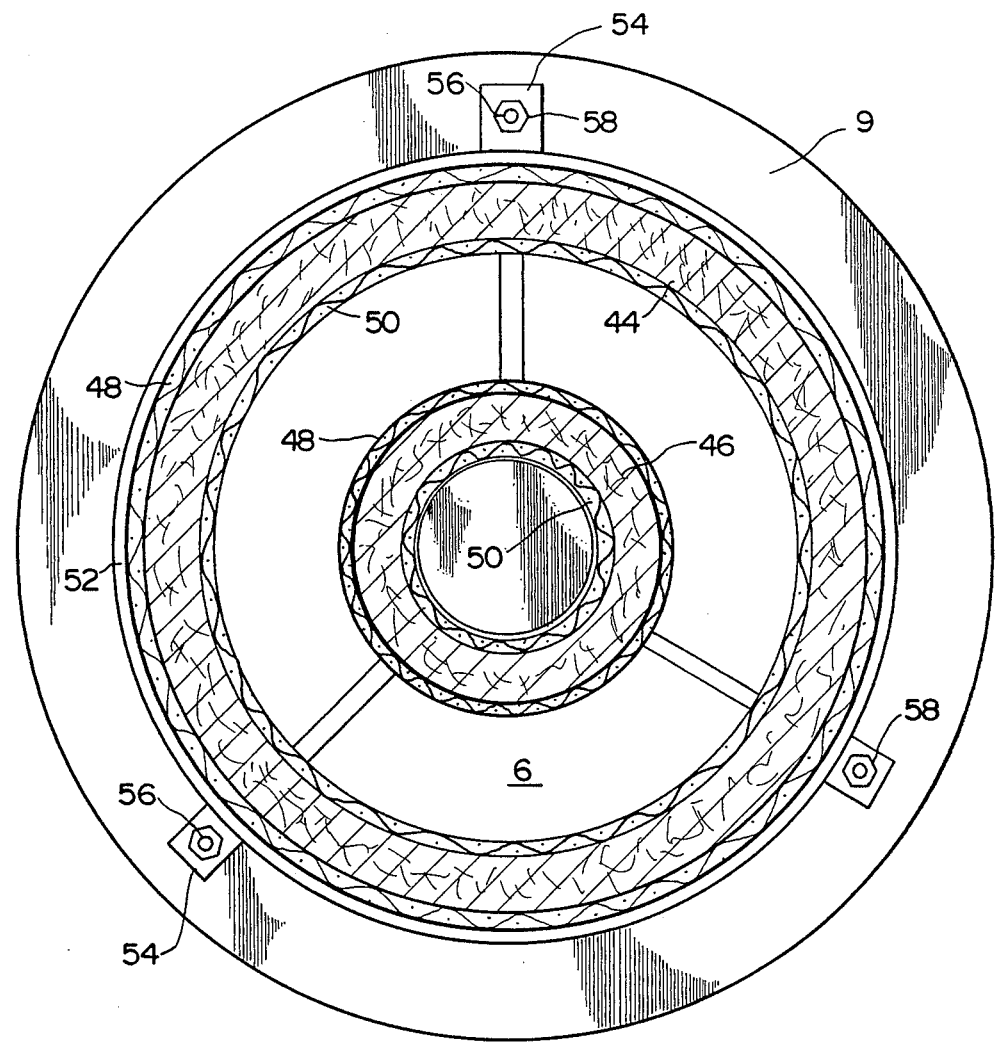
FIG. 2 is a sectional view of the mist eliminator taken in the direction of the arrows along the section line 2—2 of FIG. 1.
Figure 3:
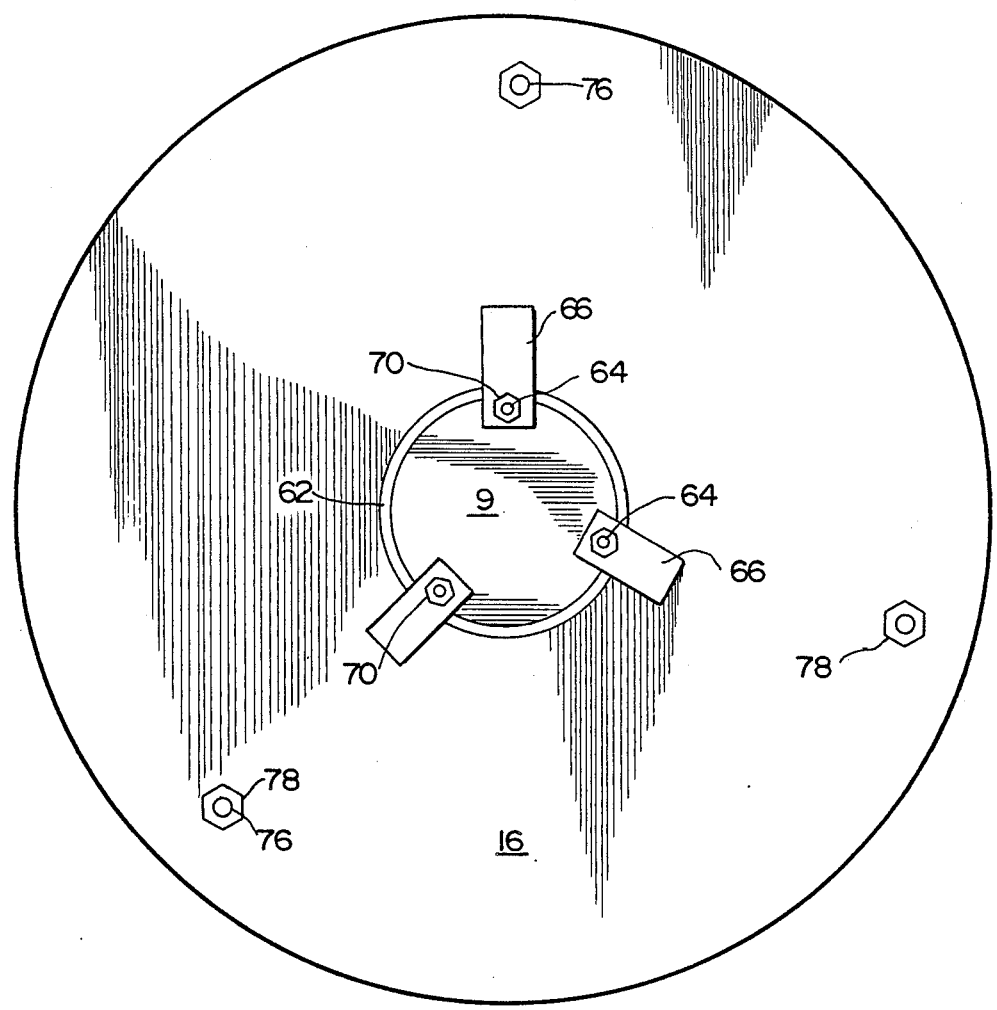
FIG. 3 is a sectional view of the mist eliminator taken in the direction of the arrows along section line 3—3 of FIG. 1.

Referring now to FIGS. 2 and 3, fiber beds 14 and 10 comprise bed portion 44 and 46, respectively. Bed portion 44, preferably, comprises randomly distributed fibers having a mean diameter in the range from about 2 to about 50 microns. It is also presently preferred that these fibers be packed to a density ranging from about 6 to about 12 pounds per cubic foot. Suitable fiber materials which can be employed when practicing the present invention include, but are not limited to, fibers of polymeric materials (e.g., polyesters, polyvinylchloride, polyethylene, fluorocarbons, nylons, polypropylene); glass fibers; and, ceramic fibers and mixtures thereof. It is to be understood that bed portion 46, of inner fiber bed 10, need not be made of the same material(s) as bed portion 44 of outer fiber bed 14. Preferably, however, the composition of bed portion 46 is substantially identical to that of bed portion 44.

Bed portions 44 and 46 are, preferably, sandwiched between outer cages 48 and inner cages 50. These cages can be made from any suitable material which supports fiber bed portions 46 and 48 in a substantially stationary position. It is also presently preferred that the material from which support cages 48 and 50 are prepared are inert to the atmosphere within vessel 1 during operation. Examples of suitable materials, from which support cages 48 and 50 can be prepared, include, but are not limited to, plastic, metal and/or mixtures thereof.

Annular ring 52 is affixed (e.g., by welding or other means) to the outer periphery of cage 48 of outer filter bed 14, adjacent to the lower end portion of the fiber bed. A series of radially outwardly extending plates 54 are spaced equal distant around ring 52. The bottom of mist eliminator 3 is partially closed by first baffle plate 9. Specifically, first baffle plate 9 closes off the lower end of annular space 20 while leaving the lower end of radially annular space 6 opened.

Baffle plate 9 is secured in place by bolts 56 which pass through corresponding openings located in outwardly extending plates 54, first baffle plate 9 and tube sheet 4. Bolts 56 are secured by their upper and lower ends by nuts 58. Bolts 56 nd nuts 58 effectively clamp outer fiber bed 14 to first baffle plate 9 and first baffle plate 9 to tube sheet 4. Optionally, a gasket or sealer-type material 60 can be interposed between the lower end of baffle plate 9 and the upper end of tube sheet 4. If such a sealer mechanism is employed, it should be observed that it does not obstruct the flow of gas entering into radially annular space 6.

Referring now to FIG. 3, annular ring 62 is affixed (e.g., by welding or other means) to the inner periphery of support cage 50 of inner fiber bed 10, adjacent to the upper end portion of the fiber bed. Annular ring 62 has affixed thereto vertically extending bolts 64 which extend beyond the upper end of mist eliminator 3.

The top of mist eliminator 3 is partially closed by second baffle plate 16. Specifically, second baffle plate 16 closes off the upper end of radially annular space 6 while leaving the upper end of annular space 20 opened. Baffle plate 16 comprises a series of plates 66 radially extending inwardly into opening 24.

Second baffle plate 16 is secured to inner filter bed 10 by bolts 64 which pass through corresponding openings in plate 66. Bolts 64 are secured by nuts 70.

Second baffle plate 16 is also fixably secured to outer filter bed 14 by annular ring 72 affixed to the outer periphery of cage 48 of outer fiber bed 14, adjacent to the upper end portion thereof (see, FIG. 1). A series of radially outwardly extending plates 74 are spaced equal distant around ring 72. Upper baffle plate 16 is fixably secured to outer fiber bed 14 by bolts 76 which pass through corresponding orifices in second baffle plate 16 and plates 74. Bolts 76 are secured to second baffle plate 16 and plates 74 by nuts 78.

Although the fiber bed mist eliminator 3 illustrated in FIGS. 1–3 is shown to be cylindrical, any desirable polygonal cross-section configuration can be employed. Furthermore, although preferred, it is not necessary for the inner fiber bed to have the same cross-sectional configuration as the outer fiber bed. For example, it is within the scope of the present invention for the inner fiber bed to have a square configuration while the outer fiber bed has a cylindrical configuration.

Figure 5:
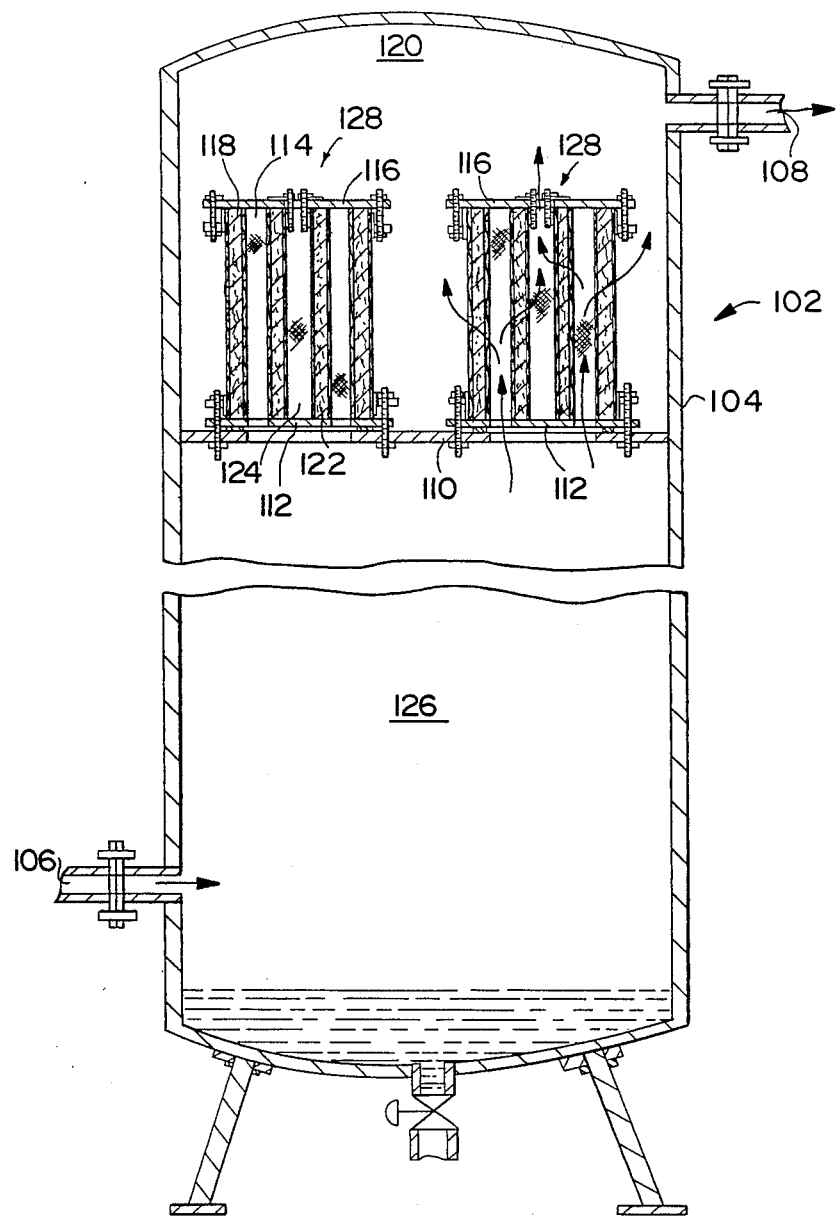
FIG. 5 is a cross-sectional view of a fiber bed separator assembly constructed in accordance with the invention.

Referring now to FIG. 5, a cross-sectional view of a fiber bed separator assembly 102 is illustrated. Separator assembly 102 comprises vessel 104 having an aerosol-containing gas stream inlet conduit 106 and a substantially aerosol-free gas stream outlet conduit 108. Separator assembly 102 further comprises a series of inside/out mist eliminators 128 fixably attached to a tube sheet 110 located between the inlet conduit 106 and the outlet conduit 108. Tube sheet 110 spans the inside of vessel 104, separating it into high and low pressure zones 126 and 120, respectively.

For purposes of illustration, in the fiber bed separator assembly shown in FIG. 5, the mist eliminators 108 are shown to be supported by tube sheet 110. It should be understood, however, that it is also within the scope of this invention for the mist eliminators 128 to be suspended from the tube sheet as illustrated in FIG. 4. Furthermore, it should also be understood that again, for purposes of illustration, FIG. 5 shows only two mist eliminators being employed. It is within the scope of this invention, however, to employ any number of mist eliminators.

Referring again to FIG. 5, in operation, an aerosol-containing gas stream is introduced into vessel 104 through gas stream inlet conduit 106. The rate at which gas flows into vessel 104 must not result in re-entrainment of aerosols collected by the mist eliminators. Generally, the flow rate of the gas stream being introduced into vessel 104 can range from about 1 to about 500,000 cubic feet per minute, preferably from about 5 to about 250,000 cubic feet per minute, and more preferably, from about 10 to about 100,000 cubic feet per minute.

After being introduced through conduit 106, the aerosol-containing gas stream travels upwardly through corresponding openings in tube sheet 110 and lower baffle plates 112 and into radially annular spaces 114. Since the upper end of space 114 is closed by the upper baffle plate 116, the aerosol-containing gas stream is forced to flow through outer fiber bed elements 118 into space 120 or through inner fiber bed elements 122 into space 124, and then into space 120. After entering space 120, the now, substantially aerosol-free gas stream flows out of vessel 104 through outlet conduit 108.

When practicing the present invention, the rate at which the gas stream flow through either fiber bed 118 or 122 should be less than that which results in a substantial re-entrainment of collected aerosols. The flow rate of a gas stream through the fiber bed elements of the novel mist eliminator is any rate less than about 200 feet per minute. While there is no lower limit, for practical purposes, the flow rate of a gas stream passing through the fiber bed elements of the novel mist eliminator should be greater than about 1 foot per minute. Preferably, this flow rate ranges from about 10 to about 200 feet per minute, more preferably, from about 20 to about 100 feet per minute.

The flow rate of a gas stream through the fiber bed elements of the novel mist eliminator can be controlled by the manipulation of many different parameters. For example, if all other is held constant, the flow rate of a gas stream through the fiber bed elements can be decreased by increasing the volume (e.g., width) of the annular space into which the aerosol-containing gas stream enters.

The flow rate of a gas through the fiber bed elements can also be decreased by increasing the fiber beds' surface area. This can be done by any one of the following: (1) increasing the number of mist eliminators used in a specific separator device, (2) increasing the size of the individual mist eliminators and/or (3) increasing the number of concentrically disposed and radially spaced fiber bed elements per each mist eliminator.

Generally, the width of the radially annular space between two adjacent fiber bed elements ranges from about 0.25 inch to about 24 inches, preferably from about 0.5 inch to about 18 inches, and more preferably, from about 0.5 inch to about 1 inch.

Figure 6:
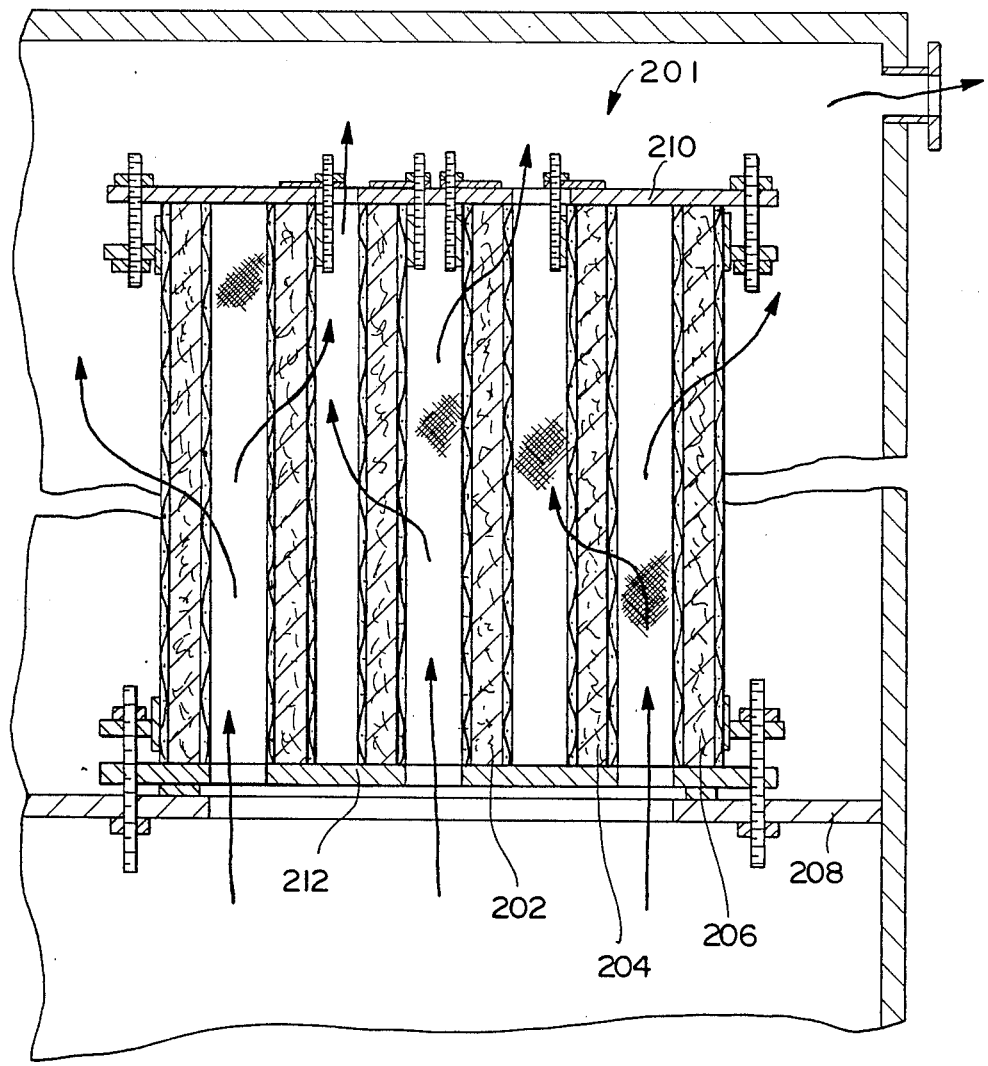
FIG. 6 is another fiber bed mist eliminator constructed in accordance with the invention.

Referring now to FIG. 6, another configuration of a mist eliminator, also encompassed within the scope of the present invention, is illustrated. Specifically, in FIG. 6, the mist eliminator 201 comprises an inner fiber bed element 202, an intermediate fiber bed element 204 and an outer fiber bed element 206. Although FIG. 6 illustrates an embodiment wherein the mist eliminator 201 is supported by a tube sheet 208, it should be understood that mist eliminator 201 can also be suspended from tube sheet 208 similar to the embodiment illustrated in FIG. 4.

FIG. 6 clearly illustrates that, due to the novel configuration and placement of the upper and lower baffle plates 210 and 212, respectively, gas streams entering the separation assembly containing mist eliminator 201 will not pass through more than one fiber bed element.

It is evident from the foregoing that various modifications can be made to the embodiments of the present invention without departing from the spirit and/or scope thereof. Having thus described the invention, it is claimed as follows:

That which is claimed is:

1. A fiber bed mist eliminator useful for the removal of aerosols of less than 3 microns, as a liquid phase, from a moving gas stream, the fiber bed mist eliminator comprising:
   a. at least two independent, radially spaced and concentrically disposed fiber bed elements, each fiber bed element having an opened upper and lower end forming substantially vertical independent channels, and
   b. baffle means, comprised of gas impervious material, horizontally disposed at the upper and lower ends of the fiber bed mist eliminator, closing the bottom of one channel and the top of an adjacent channel, for forcing an aerosol-containing gas stream to pass through not more than one of the fiber bed elements.

2. A fiber bed mist eliminator as in claim 1 comprising three radially spaced concentrically disposed fiber bed elements.

3. A fiber bed mist eliminator as in claim 1 comprising two radially spaced concentrically disposed fiber bed elements.

4. A fiber bed mist eliminator as in claim 1 wherein said fiber bed elements comprise randomly-distributed fibers sandwiched between an outer cage and an inner cage.

5. A fiber bed mist eliminator as in claim 4 wherein said fibers have a mean diameter in the range from about 2 microns to about 50 microns and wherein said fibers are packed to a density ranging from about 6 to about 12 pounds per cubic foot.

6. A fiber bed mist eliminator as in claim 4 wherein said fibers comprise materials selected from the group consisting essentially of polymeric compounds, glass fibers, ceramic fibers and mixtures thereof.

7. A fiber bed mist eliminator as in claim 6 wherein said polymeric materials comprise at least one compound selected from the group consisting essentially of polyesters, polyvinylchloride, polyethylene, fluorocarbons, nylons, and polypropylene.

8. A fiber bed mist eliminator as in claim 4 wherein said inner and outer support cages comprise materials which are substantially inert to the gas stream and the contaminants entrained therein which pass therethrough.

9. A separator assembly for the removal of aerosols from a gas stream, said assembly comprising:
   (a) a closed vessel having an aerosol-containing gas stream inlet means and a substantially aerosol-free gas stream outlet means,
   (b) a tube sheet located between said inlet means and said outlet means, said tube sheet spanning the inside of said vessel and separating said vessel into a high pressure zone and a low pressure zone, and
   (c) at least one fiber bed mist eliminator fixably attached to said tube sheet, said fiber bed mist eliminator comprising at least two independent, radially spaced and concentrically disposed fiber bed elements, each fiber bed element having an opened upper and lower end forming substantially vertical independent channels, and baffle means, comprised of gas impervious material, horizontally disposed at the upper and lower ends of the fiber bed mist eliminator, closing the bottom of one channel and the top of an adjacent channel, for forcing an aerosol-containing gas stream to pass through not more than one of the fiber bed elements.

10. A separator assembly as in claim 9 wherein said at least one fiber bed mist eliminator is fixably attached to the upper surface of said tube sheet.

11. A separator assembly as in claim 9 wherein said at least one fiber bed mist eliminator is fixably attached to the lower surface of said tube sheet.

12. A separator assembly as in claim 9 wherein said fiber bed elements comprise randomly-distributed fibers.

13. A separator assembly as in claim 12 wherein said fibers have a mean diameter in the range from about 2 microns to about 50 microns and wherein said fibers are packed to a density ranging from about 6 to about 12 pounds per cubic foot.

14. A process for the substantial removal of aerosols entrained in a moving gas stream, by the employment of a separator assembly comprising a closed vessel having an inlet means and an outlet means, a tube sheet located between said inlet means and said outlet means, said tube sheet spanning the inside of said vessel and separating said vessel into a high pressure zone and a low pressure zone, and at least one fiber bed mist eliminator fixably attached to said tube sheet, wherein said fiber bed mist eliminator comprises at least two independent, radially spaced and concentrically disposed fiber bed elements, each fiber bed element having an opened upper and lower end forming substantially vertical independent channels, and baffle means, comprised of gas impervious material, horizontally disposed at the upper and lower ends of the fiber bed mist eliminator, closing the bottom of one channel and the top of an adjacent channel, for forcing an aerosol-containing gas stream to pass through not more than one of the fiber bed elements, said process comprising:
   (a) introducing an aerosol-containing gas stream into said vessel through said inlet means,
   (b) passing said aerosol-containing gas stream through not more than one fiber bed mist eliminator fiber bed element, to form a substantially aerosol-free gas stream, and
   (c) removing said substantially aerosol-free gas stream from said vessel through said outlet means.

15. A process as in claim 14 wherein the flow rate of said aerosol-containing gas stream into said vessel through said inlet means ranges from about 1 cubic foot per minute to about 500,000 cubic feet per minute.

16. A process as in claim 15 wherein the flow rate of said aerosol-containing gas stream into said vessel through said inlet means ranges from about 5 cubic feet per minute to about 250,000 cubic feet per minute.

17. A process as in claim 16 wherein the flow rate of said aerosol-containing gas stream into said vessel through said inlet means ranges from about 10 cubic feet per minute to about 100,000 cubit feet per minute.

18. A process as in claim 14 wherein the rate at which said aerosol-containing gas stream passes through said fiber bed element is less than that which results in a substantial re-entrainment of collected aerosols onto the gas stream from which said aerosols were removed.

19. A process as in claim 18 wherein said rate at which said aerosol-containing gas stream passes through said fiber bed element is less than about 200 feet per minute.

20. A process as in claim 19 wherein said rate at which said aerosol-containing gas stream passes through said fiber bed element is in the range from about 1 foot per minute to about 200 feet per minute.

* * * * *